Figure 1:
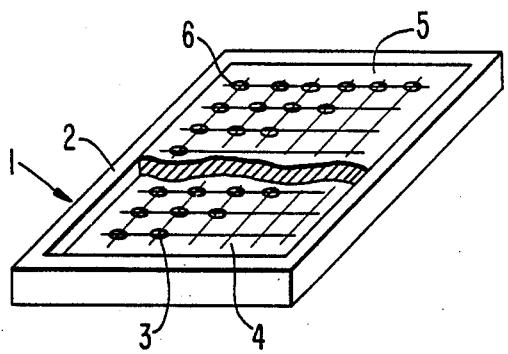

United States Patent [19]

Nitta et al.

[11] Patent Number: 4,788,931
[45] Date of Patent: Dec. 6, 1988

[54] TOOL FOR FORMING EXTERNAL ELECTRODES OF CHIP PARTS

[75] Inventors: Koichi Nitta; Kazuma Kabuta; Masami Yamaguchi; Tadahiro Nakagawa, all of Fukui; Katsuyuki Moriyasu, Kyoto, all of Japan

[73] Assignee: Murata Manufacturing Co., Ltd., Nagaokakyo, Japan

[21] Appl. No.: 16,714

[22] Filed: Feb. 19, 1987

Related U.S. Application Data

[62] Division of Ser. No. 671,585, Nov. 15, 1984, Pat. No. 4,664,943.

[30] Foreign Application Priority Data

Nov. 17, 1983 [JP] Japan ............................ 58-217177

[51] Int. Cl.$^4$ .............................................. B05C 13/02
[52] U.S. Cl. ...................................... 118/503; 118/500
[58] Field of Search ............................. 118/503, 500

[56] References Cited

U.S. PATENT DOCUMENTS

| 4,381,321 | 4/1983 | Braden | 427/58 |
| 4,393,808 | 7/1983 | Braden | 118/503 |
| 4,395,184 | 7/1983 | Braden | 414/17 |

Primary Examiner—John McIntosh
Attorney, Agent, or Firm—Wenderoth, Lind and Ponack

[57] ABSTRACT

A method of forming external electrodes at both ends of chip parts while elastically holding the chip parts. The method includes providing first and second holding plates having elastic material provided with a plurality of chip receiving holes passing therethrough from the front side to the reverse side thereof, pushing chip parts into the receiving holes in the first holding plate from the front side thereof a distance only sufficient to have the one ends of said chip parts exposed at the front surface of the first holding plate, coating the one ends of the chip parts which are exposed at the front surface of the first holding plate, with an electrode material, placing the front surface of the first holding plate in spaced opposed relationship to the front surface of the second holding plate with the receiving holes in the respective holding plates aligned, pushing the other ends of the chip parts held by the first holding plate to transfer the chip parts into the receiving holes in the second holding plate with the one ends which are coated with the electrode material sufficiently far into the receiving holes of the second holding plate to leave the other ends of the chip parts which are not coated with electrode material exposed at the front surface of the second holding plate, coating the other ends of the chip parts which are exposed at the front surface of the second holding plate with an electrode material, and pushing the chip parts out of the second holding plate by pushing on the one ends of the chip parts from inside the receiving holes of the second holding plate.

9 Claims, 3 Drawing Sheets

TOOL FOR FORMING EXTERNAL ELECTRODES OF CHIP PARTS

This application is a divisional application of Ser. No. 671,585, filed Nov. 15, 1984, now U.S. Pat. No. 4,664,943.

The present invention relates to a method of forming external electrodes at both end portions of chip parts in which chip parts such as chip capacitors and chip resistors are pushed in receiving holes formed in an elastic member constituting a holding plate and to a tool for practicing this method.

Since chip parts such as chip capacitors and chip resistors are very small, it is very difficult to treat chip parts one by one in the formation of external electrodes at both ends thereof.

Figure 2:
Figure 3:
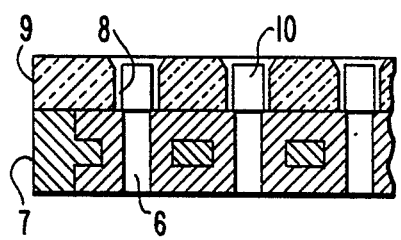
Figure 4:
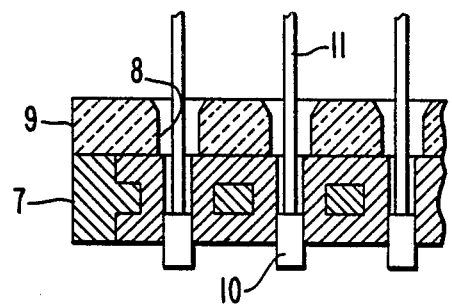

Therefore, holding plates for chip parts disclosed in U.S. Pat. No. 4,381,321, 4,393,803 and 4,395,184 and shown in FIGS. 1 and 2 have been proposed and a plurality of chip parts have been simultaneously treated. In FIGS. 1 and 2, numeral 1 designates a hard substrate constituted by a flat plate member 4 made of metal such as aluminum, resins and the like and provided with a plurality of through holes 3 and mounted inside a frame member 2, said flat plate member 4 being provided with elastic material 5 made of silicon rubber and the like surrounding said passing-through holes 3 and receiving holes 6 for said chip parts being formed at the portions of said passing-through holes 3 in said elastic material 5 to form said passing plates. The thus constructed holding plates have chip parts pushed into said receiving holes 6 and said chip parts are held by the action of the elastic force of said elastic material 5. The following method has been adopted in order to form external electrodes at both end portions of the chip parts held in such holding plates. That is to say, as shown in FIGS. 3 and 4, a guide plate 9 is positioned on the surface of a holding plate 7 having the above described construction, and plate 9 is provided with a plurality of through holes 8 arranged in the same manner as said receiving holes 6 of said holding plate 7, chip parts 10 are inserted into said through holes 8 of said guide plate 9. The holding plate 7 and said guide plate 9 are placed on the stand of a press (not shown), and said chip parts 10 are pressed downwardly by press pins 11 of said press to push them into said receiving holes 6 so that chip parts are elastically held in a condition in which lower end of said chip parts 10 is exposed at the reverse side of said holding plate 7.

Figure 5:
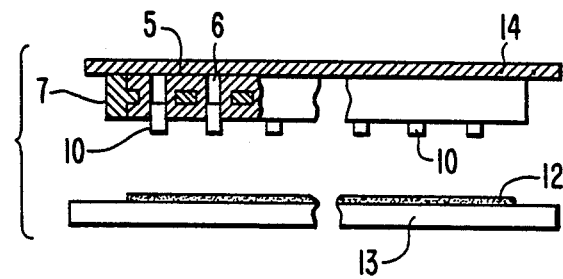

In addition, the plurality of said press pins 11 corresponding to said receiving holes 6 are mounted on one body and go up and down together. Then, said holding plate 7 is removed from the stand of said press and each one end of said chip parts 10 is coated with an electrode by pressing it against an electrode plate 13 on which a paste-like electrode material 12, such as silver is coated, by a pressing plate 14, as shown in FIG. 5. After the electrodes are dried, said chip parts are pushed back by pushing them by means of press pins from the reverse side of said holding plate until the other end, which is not coated with an electrode yet, is exposed at the upper surface of said holding plate 7 in the same manner as above described. Said exposed other end is coated with an electrode are dried, said chip parts are pushed onto the upper surface of said holding plate by means of press pins. Then, said chip parts are heated at the appointed temperature to finish the process for forming electrodes.

However, according to the conventional method of forming external electrodes by use of a holding plate having the above described construction, since chip parts are moved from the upper side of a holding plate to the reverse side of the holding plate in the receiving holes of said holding plate and the end portions of said chip parts pushed by means of press pins are exposed at the upper side and the reverse side of said holding plate, there are various kinds of problems. For example, nonuniform lengths of chip parts cause nonuniform sizes of the portions to be exposed at the upper side and the reverse side of said holding plate according to the nonuniformity in the lengths of chip parts, thereby resulting in the nonuniform adherence of electrode material. In addition, since chip parts are pushed by the action of the elastic force of an elastic member in said receiving holes, a large pushing force is required in order to move said chip parts between the upper surface of a holding plate and the reverse side of said holding plate, which requires the driving device for the press pins to be large-sized. Furthermore, since chip parts are pushed into the receiving holes of holding plate by a large pushing force, the elastic member surrounding said chip parts is stretched in the direction of pushing said chip parts to form a tongued and grooved face in the side at which said chip parts are exposed, thereby resulting in the nonuniform exposure of chip parts. Morever, since chip parts are pushed into the receiving holes of the holding plate by a large pushing force, press pins pushing chip parts sometimes slip from the surfaces of the chip parts and collide with the inside walls of receiving holes, whereby said inside walls are injured, and therefore said chip parts are difficult to move.

Thus, it is an object of the present invention to provide a method of forming external electrodes on chip parts, in which the nonuniformity in size of the portions exposed at the upper side.or the reverse side of a holding plate for said chip parts can be reduced so as to stabilize the adherence of electrodes and so that a small pushing force is enough for pushing said chip parts into the receiving holes of said holding plate, and a tool used for practicing said method.

In order to achieve this object, a first holding plate and a second holding plate are used, each of said chip parts being pushed into receiving holes of said first holding plate through a guide plate for exposing the other end of said chip parts, said exposed other end of said chip parts being coated with an electrode material, and then said other end, which is coated with an electrode material, being pushed into receiving holes of said second holding plate for exposing the one end, which is not coated with an electrode material, of said chip parts held in said first holding plate through a spacer, and said exposed one end of said chip parts then being coated with an electrode.

It is a further object of the present invention to greatly reduce the nonuniformity in size of the portion of the chip parts exposed from the holding plate and to stabilize the area of parts exposd from the holding plate and to stabilize the area of electrode material adhered to the end portions of said chip parts and the quantity of electrode material adhered to said end portions of said chip parts.

It is the still further object of the present invention to make a large pushing force unnecessary and to make possible a reduction in size of the driving device for the press pins by pushing only one end portion of the chip parts into the receiving holes of a holding plate without pushing the whole length of said chip parts into said receiving holes of said holding plate.

It is another object of the present invention to prevent press pins from slipping from the surfaces of chip parts so as to injure the inside walls of receiving holes when said chip parts are pushed into said receiving holes of a holding plate, thereby to lengthen the life of said holding plate.

Figure 6:
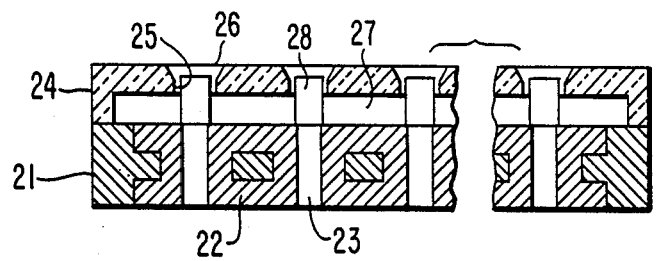
Figure 7:
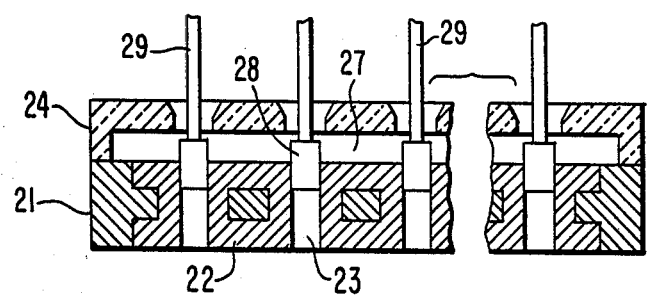
Figure 8:
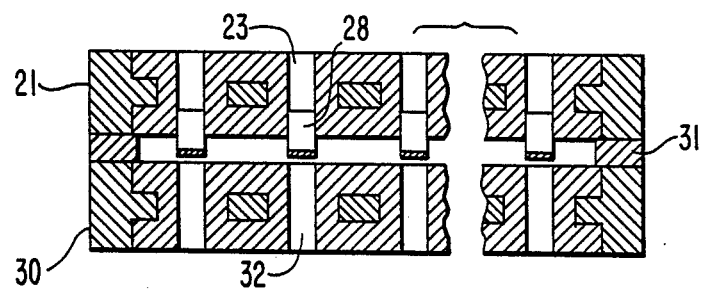
Figure 9:
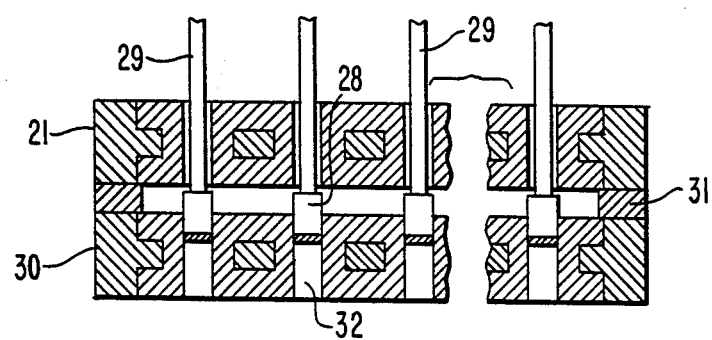
Figure 10:
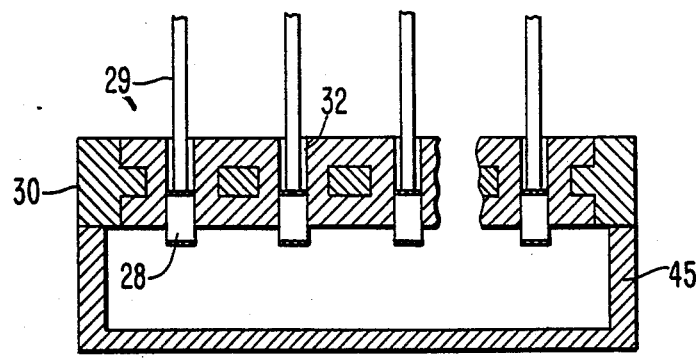
Figure 11:
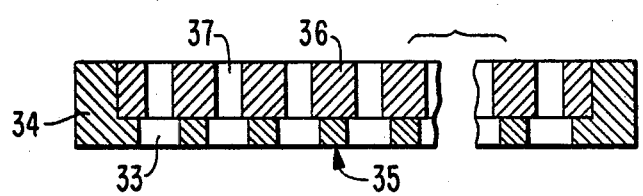
Figure 12:
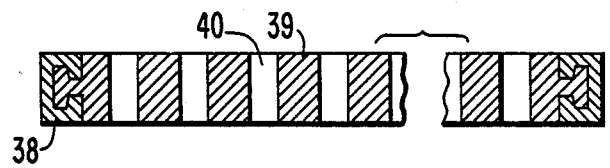
Figure 13:
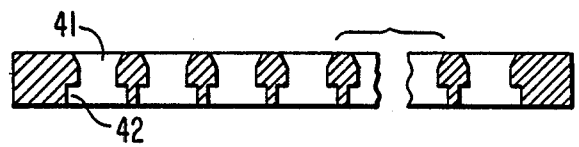
Figure 14:
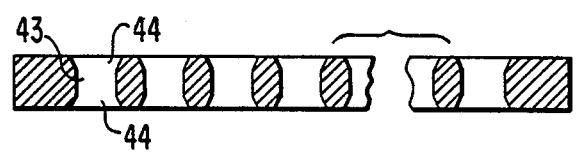

The above and other objects and features of the invention will appear more fully hereinafter from a consideration of the following description taken in connection with the accompanying drawings wherein:

FIG. 1 is a partial perspective view showing the essential components of a conventional holding plate, FIG. 2 is a vertical sectional view showing the essential components of the conventional holding plate, FIGS. 3 and 4 are partial vertical sectional views of a holding plate and a guide plate for explaining the conventional method of holding chip parts in a holding plate, FIG. 5 is a diagram for explaining a means for coating chip parts held in a holding plate with electrode material, FIGS. 6 and 7 are vertical sectional views of a holding plate and a guide plate used according to one preferred embodiment of the method of the present invention, FIGS. 8 and 9 are vertical sectional views of the first holding plate and the second holding plate used according to another preferred embodiment of the method of the present invention, FIG. 10 is a vertical sectional view showing the state in which press pins are inserted into receiving holes of the second holding plate of FIG. 9 from the reverse side of said second holding plate to push out chip parts into a saucer under the reverse side of said second holding plate, FIGS. 11 and 12 are vertical sectional views showing another preferred embodiment of a holding plate used in the present invention, and FIGS. 13 and 14 are vertical sectional views showing other preferred embodiments of guide plates used in the present invention.

A method of forming external electrodes of chip parts according to the present invention and a tool used for practicing said method will be described below with reference to the drawings.

Referring now to FIG. 6, numeral 21 designates a holding plate for chip parts having the same construction as the conventional one, formed of an elastic material 22 made of silicon rubber and the like and provided with receiving holes 23 for said chip parts passing through from the front side (the top side of FIG. 6) to the reverse side of said elastic material 22. Although said receiving holes 23 may have optional shpaes such as a circular shape and a square shape, in general they are formed in a circular shape having a small diameter so that said chip parts may be elastically pushed into said receiving holes of the holding plate. Numeral 24 designates a guide plate provided with a plurality of through holes 25 arranged in the same manner as said receiving holes 23 of said holding plate 21, cone-shaped concave portions 26 being formed around each of said through holes 25 on the from side of said guide plate 24, and a concave recess 27 being formed over almost all the reverse side of said guide plate 24. The size of said through holes 25 of said guide plate 24 are selected so that a small gap is formed between chip parts inserted into said through holes 25 and the inside walls of said through holes 25. Said guide plate 24 is placed on the front side of said holding plate 21 so that said receiving holes 23 of said holding plate 21 and said through holes 25 of said guide plate 24 are aligned with each other. Then, chip parts 28 are inserted into each of said through holes 25 of said guide plate 24. At this time, said chip parts 28 can be naturally inserted into said through holes 25 by placing a plurality of chip parts on the front side of said guide plate 24, and applying suction to said receiving holes 23 of said holding plate 21 from the reverse of said guide plate 24 by means of a suction apparatus (not shown) and simultaneously shaking said guide plate 24 and holding plate 21 right and left as well as back and forth, since the edges of said through holes 25 in said guide plate 24 are cone-shaped. The, said holding plate 21 and said guide plate 24 are placed on the stand of a press (not shown), said chip arts 28 are pushed downwardly by means of press pins 29 having the same construction as the conventional one, as shown in FIG. 7, a distance just sufficient to leave the upper ends of said chip parts exposed on the front side of said holding plate 21, and the lower ends of said chip parts being pushed into said receiving holes 23 to elastically hold said chip parts 28. In this condition, said holding plate 21 and said guide plate 24 are taken from the stand of the press and said guide plate 24 is removed from said holding plate 21. Since said guide plate 24 is provided with a concave recess portion 27 on the reverse side thereof, said guide plate 24 can be easily removed from said holding plate 21 without striking against the exposed portions of said chip parts 28. The one end of each of said chip parts 28 exposed on the front side of said chip parts 28 and elastically held in said holding plate 21 is coated with an electrode material in the conventional manner as shown in FIG. 5. In short, one end of each of said chip parts 28 is pressed against a plate 13 coated with paste-like electrode material 12.

Then, said chip parts 28 are heated under a condition such that the electrode material is dried and they are held in said holding plate 21 to dry the coated electrode material. Then the first holding plate 21 has the front surface placed on a metal, resins or the like, as is the frame of the holding plates, between the holding plates and having the same size as the frame member of the holding plates with the one ends of said chip parts 28 exposed from said holding plate 21 facing to the front surface of said second holding plate 30, as shown in FIG. 8. In this case, the receiving holes 23 of said first holding plate 21 and the receiving holes 32 of said second holding plate 30 are aligned with each other and the thickness of said spacer 31 is at least the thickness of the exposed portions of said chip parts 28 held in said first holding plate 21. In addition, the thickness of said spacer 31 must be less than the total length of said chip parts 28. Then, said first holding plate 21 and said second holding plate 30 are placed on the stand of a press (not shown) and chip parts held in said first holding plate 21 are transferred onto said second holding plate 30 by inserting said press pins 29 into said receiving holes 23 of said first holding plate 21 from the reverse side of said first holding plate 21 to push said chip parts 28 into the receiving holes of said second holding plate a distance just sufficient to expose the other ends of said chip parts 28, which are not coated with an electrode material, on the front side of said second holding plate 30 with the one ends of said chip parts, which are coated with an electrode material, in said receiving holes 32 of said second holding plate 30. Then, theses holding plates are removed from the stand of the press and the respective other ends, which are exposed on the front side of said second holding plate 30, are coated with an electrode material in the same manner as the one ends of said chip parts 28 were coated. Alternatively to the method shown in FIG. 5, and electrode material can be applied to both end portions of said chip parts by rolling a roller, the surface of which is coated with paste-like electrode material, over the end portions of said chip parts without using the above described plate coated with an electrode. Then, said chip parts 28, which are held in said holding plate, are heated to dry the electrode material. After that, said second holding plate 30 is placed on the stand of the press (not shown), press pins are inserted into said receiving holes 32 of said second holding plate 30 to push said chip parts 28 out of the receiving holes, and said chip parts 28 being pushed out from the front side of said second holding plate 30, as shown in FIG. 10. In this case, a saucer 45 is used as a receiving member and is positioned below said second holding plate 30 and said chip parts 28 are collected in said saucer 45. Frame-like members without a bottom portion may be used as said receiving member in place of said saucer 45 as shown in FIG. 10. Any receiving member, which can support the circumference of said second holding plate 30 when press pins 29 are inserted into said second holding plate, can be used.

Finally, external electrodes are formed at both end portions of the chip parts by placing a sagger or the like containing chip parts having both end portions coated with the dried electrode material into a heat treatment furnace.

The holding plates 21 and 30 used in the above described preferred embodiment need not always have the above described construction. For example, those shown in FIGS. 11 and 12 may be used. That shown in FIG. 11 is provided with a plurality of through holes 33 in a metallic substrate 35 made of aluminum or the like having a vertical wall 34 formed around the circumference thereof, and elastic member 36 made of silicon rubber or the like is provided on the front side of substrate 35 within the vertical wall 34 with the receiving holes 37 in said elastic member 36 for receiving chip parts at the positions corresponding to said through holes 33. That show in FIG. 12 is provided with an elastic member 39 held in a metallic frame member 38 made of aluminum or the like and having receiving holes 40 formed in said elastic member. Also, said guide plate 24 used in the above described preferred embodiment is not limited to the above described construction. For example, those shown in FIGS. 13 and 14 may be used. That shown in FIG. 13 is provided with a concave recess 42 formed only around each of the through holes 41 rather than over almost all the reverse side of said guide plate 24 differently from that as shown in FIG. 7. That shown in FIG. 14 is provided with cone-shaped concave recess 44 on both the front side an the reverse side of through holes 43. The one as shown in Fig. 14 is easy to handle since it is the same on the front side and the reverse side thereof. In addition, the concave recess formed on the reverse side of such guide plates can be eliminated. Further, such guide plates can be used as said spacer 31 in the above described preferred embodiment. In this case, the thickness of said spacer 31 may exceed the total length of the chip parts since guide plate is provided with through holes corresponding to receiving holes of a holding plate.

The method of forming external electrodes on chip parts according to the present invention and the apparatus used for practicing said method exhibit the following various effects since they comprise the above described processes and apparatus.

(1) Since any nonuniformity in the size of the portion of the chip parts exposed from a holding plate in the present invention is due only to nonuniformity in the length of the press pins pushing said chip parts, the nonuniformity in the size of exposed portions of said chip parts can be greatly reduced and the area of the end portions of said chip parts, to which electrode material is adhered, and the quantity of the electrode material coated on said end portions of said chip parts can be stabilized by making the length of said press pins highly accurate. This is true even though said chip parts have nonuniformity in the length thereof.

(2) Since only one end portion of each of the chip parts is pushed into the receiving holes in a holding plate, i.e. the total length of said chip parts is not pushed into said receiving holes of said holding plate, a large pushing force is not required, which is different from the conventional method, and as a result, almost all prior art type tongued and grooved faces formed on the surface of an elastic member forming said holding plate can be eliminated, and also the size of the driving device for the press pins can be reduced.

(3) Since a large pushing force is not required for pushing chip parts into receiving holes in a holding plate, a small pushing force is enough for transferring said chip parts from the first holding plate to the second holding plate or pushing said chip parts out of said second holding plate, and therefore, there is no possibility that the inside wall surface will be injured due to the slipping of press pins from the surfaces of said chip parts, whereby the life of said holding plates can be lengthened.

(4) Holding plates can be used properly, i.e. chip parts, which are not coated with electrode material yet, are pushed into receiving holes of the first holding plate and chip parts, one end of each of which is coated with an electrode material, are pushed into receiving holes of the second holding plate, so electrode material can be completely prevented from adhering to the inside wall surfaces of the receiving holes of said first holding plate, and in addition, electrode material can be completely prevented from adhering to unnecessary places other than both end portions of said chip parts since chip parts, each end portion of which is coated with an electrode material may adhere to the inside wall surfaces of the receiving holes of said second holding plate.

What is claimed is:

1. A tool for forming external electrodes at both ends of chip parts, comprising:
   first and second holding plates each having elastic material provided with a plurality of chip receiving holes passing therethrough from a front side to a reverse side of said holding plate;
   a guide plate against the front side of said first holding plate and having guide holes aligned with said receiving holes of said holding plates; and
   a spacer between said first holding plate and said second holding plate spacing the front side of said second holding plate from the reverse side of said first holding plate, the receiving holes in said second holding plate being aligned with the receiving holes in said first holding plate.

2. A tool as claimed in claim 1 in which said holding plates are each comprised of a flat plate portion having a plurality of through holes therethrough, and a frame member around the edges of said flat plate portion, said elastic material being provided on both sides of said flat plate portion and extending through said through holes and having said receiving holes extending therethrough and through said through holes.

3. A tool as claimed in claim 1 in which said holding plates are each comprised of a flat plate portion having a plurality of through holes therethrough and a vertical wall around the edges of said flat plate portion extending away from the front side of said flat plate portion, said elastic material being a body of elastic material against the front side of said flat plate portion and having the edge thereof against said vertical wall and having said receiving holes therethrough aligned with said through holes, said through holes being larger than said receiving holes.

4. A tool as claimed in claim 1 in which said holding plates are each comprised of a frame member and an elastic member held within said frame member and having said receiving holes therein.

5. A tool as claimed in claim 1 in which said guide plate has a tapered concave recess around each of said guide holes on the front side of said guide plate.

6. A tool as claimed in claim 1 in which said guide plate has a flange depending from an edge of said guide plate around the periphery of the reverse side thereof.

7. A tool as claimed in claim 1 in which said guide plate has a tapered concave recess around each of said guide holes on the front side of said guide plate and a concave recess around each of said holes on the reverse side of said guide plate.

8. A tool as claimed in claim 7 in which said concave recesses on the reverse side of said guide plate are tapered concave recesses.

9. A tool as claimed in claim 1 in which said spacer has a thichness for spacing the ends of the receiving holes in the reverse said first holding plate a distance from the ends of the receiving holes in the front side of said second holding plate which is less than the length of the chip parts in the direction of the length of the receiving holes.

* * * * *